DIGITAL DEMODULATOR SYSTEM

Filed Sept. 26, 1967 4 Sheets-Sheet 1

INVENTORS
LAWRENCE P. NAHAY
BERNARD E. PATRUSKY
BY Edward J. Norton
ATTORNEY

| BIT DECISION | PHASE COMPARATOR | |
|---|---|---|
| 1 | + | ADVANCE |
| 0 | + | RETARD |
| 1 | - | RETARD |
| 0 | - | ADVANCE |
| 1 | 0 | NO OUTPUT |
| 0 | 0 | NO OUTPUT |

INVENTORS
LAWRENCE P. NAHAY
BERNARD E. PATRUSKY

BY Edward J Norton
ATTORNEY

INVENTORS
LAWRENCE P. NAHAY
BERNARD E. PATRUSKY
BY Edward J. Norton
ATTORNEY

DIGITAL DEMODULATOR SYSTEM

Filed Sept. 26, 1967

INVENTORS
LAWRENCE P. NAHAY
BERNARD E. PATRUSKY

BY Edward J. Norton
ATTORNEY

United States Patent Office 3,514,702
Patented May 26, 1970

3,514,702

DIGITAL DEMODULATOR SYSTEM

Lawrence P. Nahay, Cinnaminson, and Bernard E. Patrusky, Upper Dublin, N.J., assignors to RCA Corporation, a corporation of Delaware Filed Sept. 26, 1967, Ser. No. 670,650
Int. Cl. H04l 27/10
U.S. Cl. 325—320 12 Claims

ABSTRACT OF THE DISCLOSURE

This application describes a compact, high performance digitalized frequency-shift keyed or phase-shift keyed data demodulator which does not require the receipt of remotely generated transmitted timing signals for synchronization. Snychronization is obtained by sampling the energy level of the incoming data signals over a bit interval and by examining the samples of the energy level from the standpoint of balance with respect to locally generated timing signals.

BACKGROUND OF INVENTION

The invention herein described was made in the course of or under a contract or subcontract thereunder with the Department of the Air Force.

This invention relates to a signal demodulator and more particularly, to a frequency-shift keyed or phase-shift keyed digital data demodulator which requires only locally generated timing signals for synchronization.

Data signals are composed of bits of information represented by signal intervals of two or more D.C. levels occurring in a predetermined timing sequence and arranged in data words according to a code to define letters, numbers, or other predetermined symbols, which in a binary system are known as either a "mark" or "space."

Transmission accuracy and recovery of the timing of these data signals when communicated between data processing terminals has been a matter of much concern and research. The transmission accuracy is degraded by the introduction of noise and other interferences which tend to distort the data signals. Although recovery of the timing of data signals at the local terminal can be provided by using separate channels for data signals and for synchronizing timing signals, the use of a separate channel for timing signals is undesirable because it unnecessarily increases the required transmission bandwidth. Various timing recovery methods without the use of a separate channel are known. These timing recovery methods usually synchronize the local timing by the data transitions between bits of different types such as, for example, "mark" to "space" transition and "space" to "mark" transition.

It is an object of this invention to provide an improved, compact, high performance digital data demodulator.

It is another object of this invention to provide a data demodulator for frequency-shift keyed or phase-shift keyed data signals having improved timing recovery by examining the energy level of the incoming data signals over a bit interval from the standpoint of balance.

BRIEF DESCRIPTION OF THE DRAWING

In accordance with this invention these and other objects of this invention are provided by sampling the energy level of the incoming data signals applied to the demodulator over a bit interval which is T seconds, to provide during the presence of a data bit a plurality of equally distributed sampled output signals indicative of the presence of the data bit. The plurality of sampled output signals indicative of the presence of a data bit are examined with respect to the phase of locally generated timing signals, which define successive timing baud intervals of T seconds from the standpoint of balance. In accordance with an illustrated embodiment, the plurality of sample output signals registered during a first half, $T/2$ seconds, of a timing baud interval is compared with the plurality of sampled output signals registered during the second half, $T/2$ seconds, of this timing baud interval to determine if an unbalance exists. If no unbalance exists at the end of a local timing baud interval, the local timing is considered to be in synchronism with the incoming signals. If an unbalance occurs which indicates lack of synchronization of local timing with the input data signals, the unbalance yields control signals which may be employed to make phase adjustments in the locally generated signals to maintain them in synchronization with the data.

DESCRIPTION OF PREFERRED EMBODIMENTS

Figure 1:
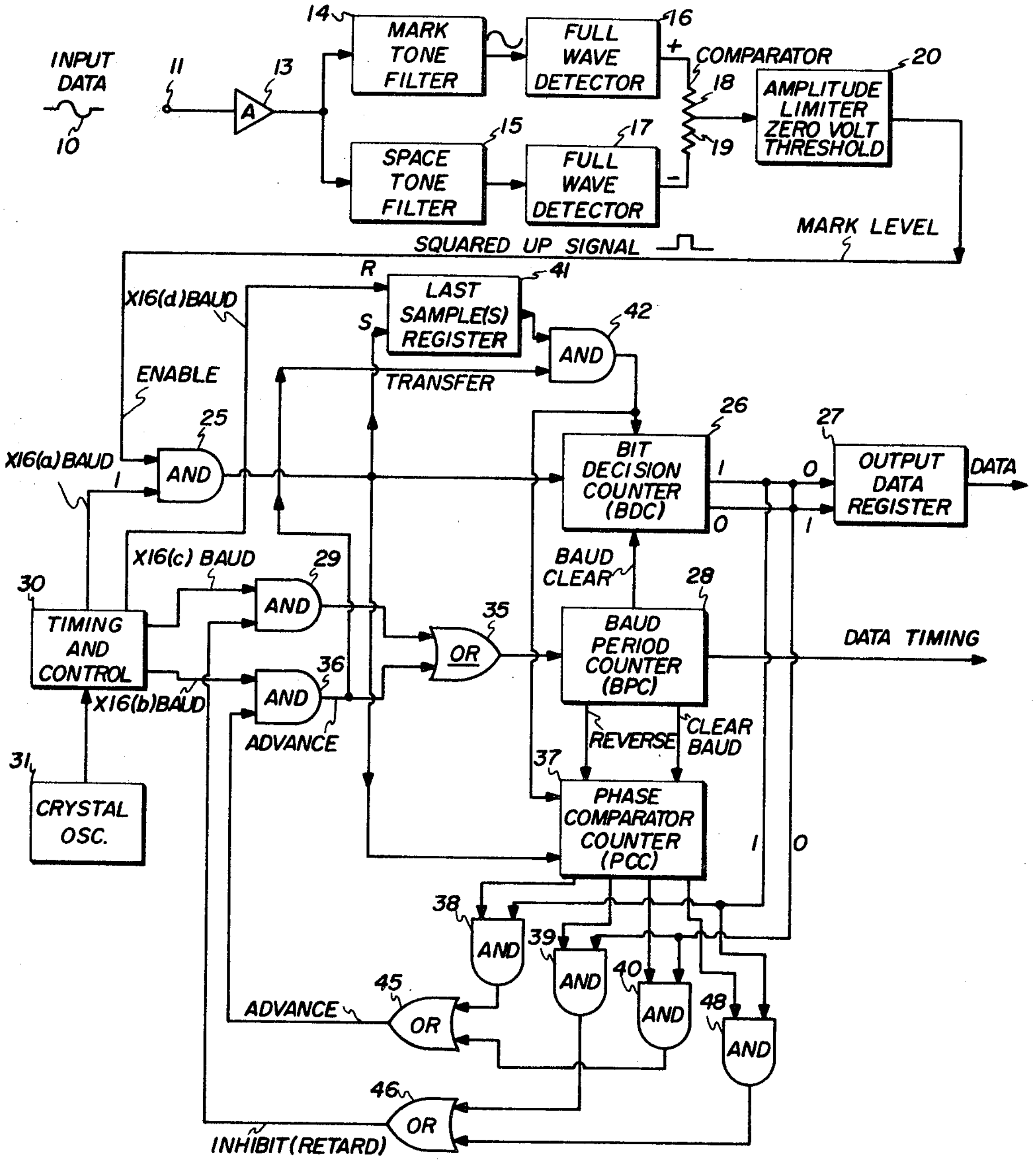

A more complete understanding of the invention and the various objectives, features and advantages thereof may be obtained from a consideration of the following detailed description taken together with the claims and the attached drawing in which:

FIG. 1 is a block diagram of a frequency-shift keyed digital demodulator in accordance with one embodiment of the present invention.

Figures 2, 3:
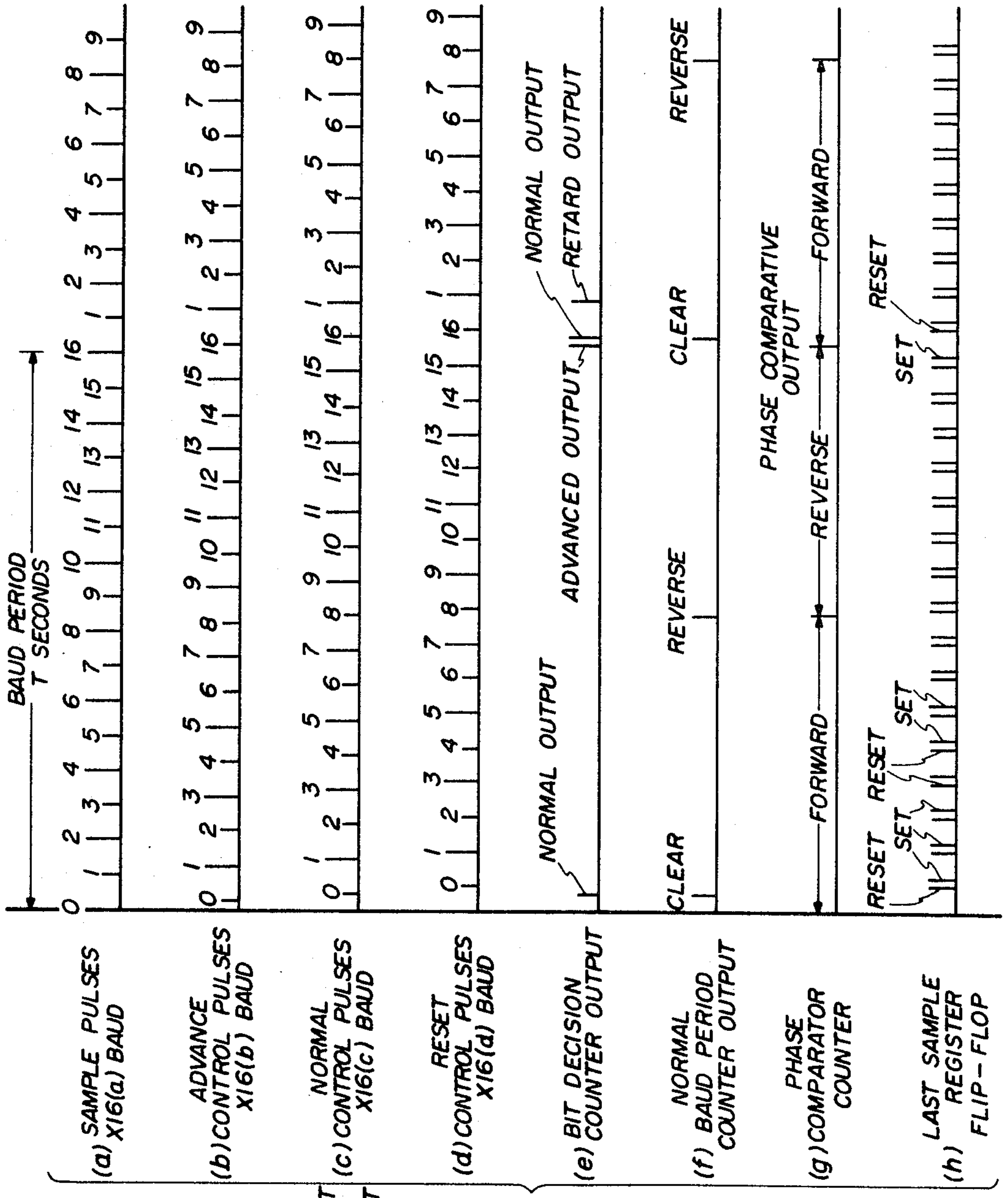

FIG. 2 is a timing diagram useful in describing the frequency-shift keyed digital demodulator of FIG. 1.

FIG. 3 is a table illustrating the advance/retard logic.

Figure 4:
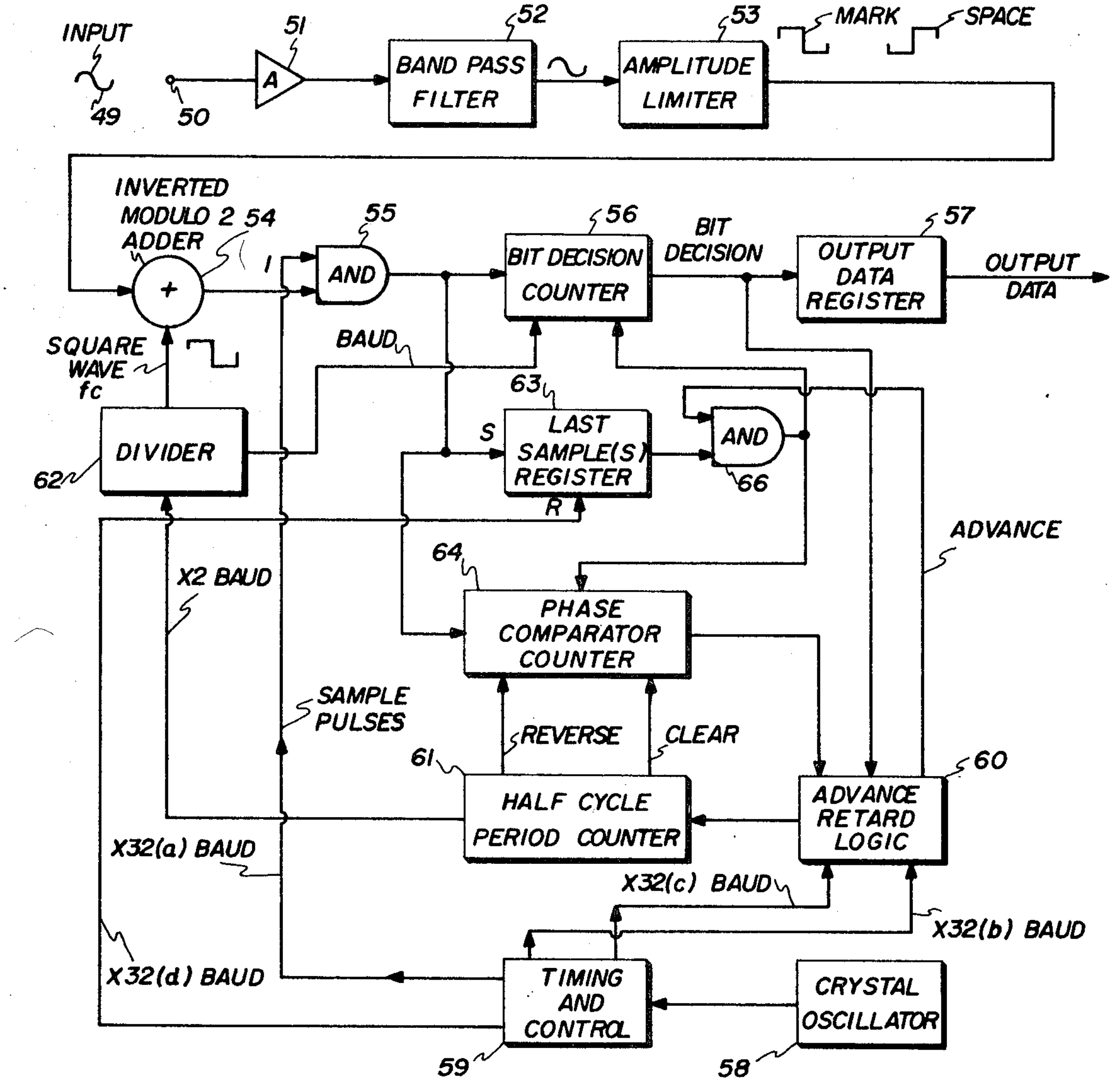

FIG. 4 is a block diagram of a phase-shift keyed digital dmedoulator in accordance with another embodiment of the present invention.

Figure 5:
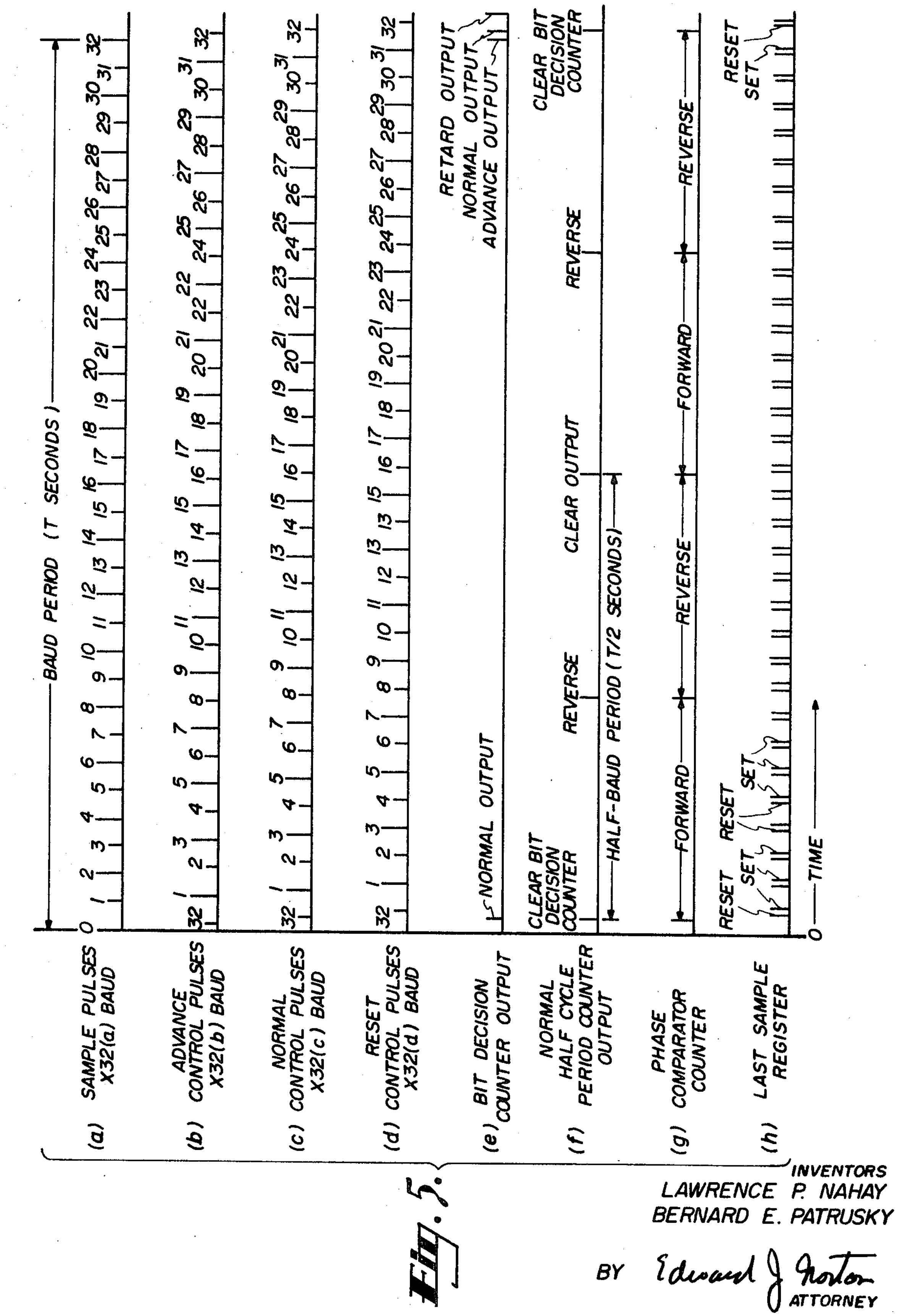

FIG. 5 is a timing diagram useful in describing the phase-shift keyed digital demodulator of FIG. 4.

In FIG. 1, frequency-shift keyed data signals 10 which in this case may be designated a "mark" or "space" frequency data signal are applied to a terminal 11. Each "mark" or "space" data signal is a bit of information which when arranged with other bits forms a data word. The signal 10 at terminal 11 is amplified through an amplifier 13 and applied to tone filters 14 and 15. The tone filter 14 is centered at the "mark" frequency to pass only signal intervals indicative of a "mark" signal, and the tone filter 15 is centered at the "space" frequency to pass only signal intervals indicative of a "space" signal. The outputs of filters 14 and 15 are coupled respectively to full wave envelope detectors 16 and 17. The output of full wave envelope detector 16 provides a positive-going full wave signal indicative of a "mark" signal interval, and the output of full wave detector 17 provides a negative going full wave detected signal indicative of a "space" signal interval. The outputs of the full wave envelope detectors 16 and 17 are compared by linear resistors 18 and 19 to provide a resultant comparative output to a zero volt threshold amplitude limiter 20 where the resultant output is quantized into one of two states. When the comparative output is above the threshold, the output square wave signal is at a logic "one" level. When the comparative output is below the threshold, the output square wave signal is at a logic "zero." By amplitude limiting the comparative output, a squared-up signal is provided at the output of the limiter 20. From this point on the squared-up signal is then sampled and processed.

The duration of each signal information bit whether it is a "mark" or a "space" signal bit has a baud period of T seconds. Timing and control circuitry 30 is responsive to locally generated oscillations from a crystal oscillator 31 to provide by means of a four phased clock for example: (a) sampling pulses at sixteen times the baud rate in a first phase (X16(a)baud); (b) advance control pulses at sixteen times the baud rate in a second delayed phase (X16(b)baud); (c) normal control pulses at sixteen times the baud rate of a third further delayed phase (X16(c)baud); and (d) reset control pulses at sixteen times the baud rate at a fourth still further delayed phase (X16(d)baud); FIG. 2 is a timing diagram of these signals. The sampling pulses (X16(a)baud) are applied to an AND gate 25. The squared-up signal from the amplitude limiter 20 when at the logic "one" level ("mark" signal condition) along with the X16(a)baud sampling pulses enables the gate 25 to provide a plurality of equally spaced sampled "one" level output pulses at sixteen times the baud rate indicative of "mark" signal interval to a bit decision counter 26 and phase comparator counter 37. In the meantime, a baud period counter 28 counts the X16(c)baud normal control pulses applied thereto from the timing and control circuitry 30 through an AND gate 29 and OR gate 35. At the count of sixteen X16(c)baud normal control pulses, the baud period counter 28 provides a clearing pulse to the bit decision counter 26 to clear the bit decision counter 26 for a new bit decision. See FIG. 2. If the bit decision counter 26 counts a given majority number of sampled output pulses per baud interval permitted by the presence of the logic "one" ("mark" signal condition) from the amplitude limiter 20 at the input of AND gate 25, the bit decision counter 26 provides a logic "one" level output to an output data register 27. If the bit decision counter 26 does not count a given majority number of output sampled pulses from AND gate 25 before being cleared by the counter 28, the bit decision counter 26 provides a logic "zero" level in the output data register 27. The majority count in this case may be a count of eight registered in the bit decision counter 26. In this manner, the technique for making a bit decision for each baud period of T seconds is by decoding the majority count of the sixteen samples spread uniformly across the entire baud period. If the majority of X16(a)baud sampling pulses from the timing and control circuitry 30 are counted during a baud period, (T), the bit decision counter 26 decodes the data bit to be a logic "one," otherwise the decision is a logic "zero." The bit decision counter 26 is cleared in response to the output clearing pulse from the baud period counter 28 so that the next baud interval may be counted. Bit decision counter 26 may be a binary counter made up of a plurality of flip-flop circuits which sequently count the enabled sampled pulses. The baud period counter 28 may likewise be a binary counter made up of a plurality of flip-flop circuits.

The frequency-shift demodulator is controlled for phase coherency with the incoming transitions by sampling the energy level of the incoming data signals over a bit interval by a plurality of sampling pulses and by examining the samples of the energy level of the data signals from the standpoint of balance with respect to the locally generated timing signals. Local timing is provided by the baud period counter 28 which is responsive to the X16(c)baud normal control pulses to provide a first control pulse at the end of every half baud interval. Sampling of the input data signals 10 is provided as mentioned by the X16(a)baud sampling pulses to AND gate 25. The enabled plurality of equally distributed sampled logic "one" level output pulses from AND gate 25 are applied to a phase comparator counter 37. In this illustrated embodiment a reversible counter 37 is provided which is responsive to the first control pulse from the baud period counter 28 for counting in one direction during the first half of the baud interval and in a reverse direction during the second half of the baud interval. This reversible or phase comparator counter 37 is responsive to the sampled output pulses applied thereto for producing at the end of a baud interval a second control signal only when a predetermined lack of balance exists between the number of sampled output pulses registered during the first and second halves.

The phase comparator counter 37 may be a reversible counter that is made up of a plurality of flip-flop circuits which upon command reverse the count so as to count back toward the starting condition. The plurality of sampled output pulses fed to the counter 26 from the AND gate 25 are also fed to a phase comparator counter 37. When the baud period counter 28 reaches the half baud count, eight (X16(c)baud normal control pulses) in the example given, an output pulse from the baud period counter 28 reverses the direction of the phase comparator counter 37 so that the counter counts back toward the zero or starting condition. See FIG. 2. If at the end of the count, the phase comparator counter 37 is at a zero or starting condition, no output is provided by the phase comparator counter 37 and the system is assumed to be in synchronism with the incoming data. FIG. 3 is a table illustrating the advance/retard logic. If however the counter 37 does not count back to zero, a plus (+) condition, a control pulse is provided from the output of the phase comparator counter 37 to AND gates 38 and 39. If a bit decesion occurs, the local timing is advanced or retarded in accordance with the bit decesion as indicated in the table of FIG. 3. If a bit decision logic "one" has occurred, for example, as indicated by an enabling level to AND gates 38 and 48 from the output of the bit decision counter 26, an output signal level from AND gate 38 enables AND gate 36 through OR gate 45. When AND gate 36 is enabled, the X16(b)baud advance control pulse from the timing and control circuitry 30 provides an extra advance pulse to the baud period counter 28. This advance pulse advances the baud period counter 28 to provide data timing at the output of the baud period counter 28 in synchronism with the incoming data timing. If however the bit decesion is a logic "zero" applied to AND gate 39 and a plus (+) condition is provided from the phase comparator counter 37 to AND gate 39, an inhibiting pulse is provided to AND gate 29 through OR gate 46.

If at the end of the count of the phase comparator counter 37, the counter goes past zero to a negative count (a minus (−) condition), an output control pulse is provided at AND gates 40 and 48. If a bit decision logic "one" has occurred as indicated by an enabling level provided to AND gates 38 and 45 from bit decision counter 26, an inhibiting pulse from AND gate 45 is provided to AND gate 29 through OR gate 46 to inhibit one of the X16(c)baud normal control pulses from the timing and control system 30 from being applied to baud period counter 28 through OR gate 35. If however the bit decision is a logic "zero" applied to AND gates 39 and 40 and a minus (−) condition is provided from phase comparator counter 37 to AND gate 40, an output signal level from AND gate 40 enables AND gate 36 through OR gate 45 to provide a X16(b)baud advance pulse to the baud period counter 28.

In this system therefore the distribution of sixteen samples at the output of AND gate 25 over the entire baud interval are examined from the standpoint of balance. The number of sampled output pulses in the first half (8 samples) of a baud period are compared in effect to the number of sampled output pulses in the second half of the same baud period. Unless there has been a transition between consecutive baud intervals, the balance information is not used. When a data transition does occur and an unbalance or difference between the number of sampled output pulses registered in the two halves of the baud interval is detected, the baud period counter 28 is made to phase correct by adding an extra pulse to advance it when the unbalance is in one sense or by inhibiting a normal pulse to retard it when the unbalance is in an opposite sense to the one sense. The direction of phase displacement (advance or retard) depends on the bit decision ("mark" or "space") as well as the sign (plus or minus) of the unbalanced difference. The bit decisions from the bit decision counter 26 are applied to the output data register 27 and can then be shifted out in phase with the output timing derived from the baud period counter 28.

Since the phase comparator counter 37 depends upon the sampled output pulses to detect unbalance of the sampled output pulses, interference of the input signal may cause an unbalance condition in the counter. Recovery of the timing of the data signal can be made less susceptible to interference by integrating the control signals over several baud intervals for agreement as to sense of unbalance since interference is usually random in nature.

When the extra advance pulse is applied to the baud period counter 28, the counter 28 clears the bit decision counter 26 and the phase comparator counter 37. The last sample which should be the first sample in the next baud interval is cleared from both counters. Unless the last sample is recoupled into both counters, the bit decision may provide an incorrect decision and certainly the phase comparator output will be unbalanced when the local timing is in synchronism with the data signals. It is therefore necessary to retrieve the last sample and recouple the last sample back into both counters before the next X16(c)baud normal control pulse is applied.

In order to retrieve the last sampled output pulse and recouple the last sampled output pulse which has been cleared out back into the bit decision counter 26 and into the phase comparator counter 37, the enabled sampled output pulses from AND gate 25 are applied to a last sample(s) register 41. The last sample(s) register 41 may be, for example, a flip-flop circuit which is set in response to the enabled sample output signals and provides a logic "one" when set or a logic "zero" when not set as an output to an AND gate 42. See FIG. 2. The last sample(s) register 41 is reset after each sampled output pulse by the X16(d)baud reset control pulses applied to the reset(R) terminal of the last sample(s) register 41 from the timing and control circuitry 30. To transfer the last stored sample at register 41 to the bit decision counter 26 and phase comparator counter 37 so as to be used again as the first sample in the next baud interval, the advance control pulse at the X16(d)baud rate from gate 36 enables AND gate 42 to transfer the last sampled output pulse back into the bit decision counter 26 and into the phase comparator counter 37.

FIG. 4 is a block diagram of a phase-shift keyed signal demodulator utilizing the same bit decision techniques and synchronism scheme as described above modified to process a phase-shift keyed signal. Phase-shifted input signals 49 are applied to input terminal 50 and amplified through amplifier 51. The amplified data signals are filtered through bandpass filter 52 and applied to an amplitude limiter 53. The amplitude limiter 53 is a zero volt threshold device providing during each baud period of T seconds a squared output signal. The squared output signal can be, for example, a "mark" signal wherein during the first half of the squared output signal the signal is a logic "one" condition and during the second half of the squared output signal the signal is below the threshold in a logic "zero" condition. The squared output signal may also be a "space" signal if the squared signal is 180 degrees out of phase with the before described "mark" signal. The "space" signal is characterized by the first half of the squared signal being below the threshold or logic "zero" level and above the threshold or logic "one" level condition during the second half as shown in FIG. 4. Timing and control circuitry 59 is responsive to oscillations from local crystal oscillator 58 to provide by means, for example, of a four phase clock: (a) sampling pulses at thirty-two times the baud rate in a first phase (X32(a) baud); (b) advance control pulses at thirty-two times the baud rate in a second delayed phase (X32(b)baud); (c) normal control pulses at thirty-two times the baud rate in a third further delayed phase (X32(c)baud); and (d) resetting control pulses at thirty-two times the baud rate at a still further delayed phase (X32(d)baud). FIG. 5 shows a timing diagram of these signals. The sampling pulses (X32(a)baud) are applied to an AND gate 55.

The X32(c)baud rate normal control pulses from the timing and control circuitry 59 are applied to a half period counter 61 through advance/retard logic 60. A squared wave equivalent to the carrier frequency is derived at the output of half period counter 61 with a free running period of $T/2$ seconds or half the baud period. At the count of sixteen X32(d)baud normal control pulses, the half cycle period counter 61 provides an output signal to a flip-flop divider 62. The flip-flop divider 62 provides for example a square wave signal where during the first half of the baud period (count of 16) the squared up signal is in the positive going direction in a logic "one" level and during the second half of the signal the square wave is in the negative going direction or logic "zero" condition to provide to an "inverted modulo 2" adder 54 a locally generated reference. The squared up received signal from the amplitude limiter 53 is "inverted modulo 2 added" to the square wave equivalent of the carrier frequency derived from the half cycle period counter 61. By "inverted modulo 2 added" is meant that a logic output of "one" is provided by the presence of two logic "ones" or two logic "zeros," while a logic "one" and a logic "zero" provide a logic "zero" at the output. In the described embodiment, the "mark" signal adds to the similar in phase reference signals to provide a logic "one" level output signal on both half cycles of the received signal and the "space" signal adds to the 180 degree out of phase reference signal to provide a logic "zero" level output signal on both half cycles of the received signal. The sampling pulses X32(a)baud sampling pulses are provided to AND gate 55 and are enabled in this case by the "mark" signal condition indicated by the presence of a logic "one" from the "inverted modulo 2" adder 54. The enabled plurality of equally spaced sampled output pulses at thirty-two times the baud rate indicative of a "mark" signal condition at the AND gate 55 are registered by the bit decision counter 56. At the end of the two half cycles of the baud period 61 when the flip-flop divider 62 returns to its previous state, a bit decision clearing pulse is provided from divider 62 to the bit decision counter 56. If the bit decision counter 56 registers a given majority count of sampled output pulses (such as the count of sixteen (16) in this case), a bit decision is made that indicates that a "mark" signal is present and provides a logic "one" level to the output register 57 and to the advance/retard logic 60.

As described in the previous case, synchronism of the input data signals with the local timing signals is provided by sensing unbalance of the sampled output pulses to provide control pulses to advance or retard the normal local timing pulses. A phase comparator counter 64 acts to test the balance of samples over each half cycle period $T/2$. In other words the number of sampled logic "ones" in the first quarter of the cycle is compared with the number of sampled logic "ones" on the second quarter. Likewise the third quarter of the cycle is compared to the fourth quarter. The unbalanced error information from the phase comparator counter 64 is provided twice per baud period to the advance/retard logic 60 which is then compared or integrated over the entire baud period for agreement as to sense of unbalance.

The half cycle counter 61 at the count of eight X32(c)baud normal control pulses provides a reverse pulse to the phase comparator counter 64 to reverse the phase comparator counter every quarter cycle or at the count of 8 control pulses. See FIG. 5. If the phase comparator counter does not reach zero for both half cycles, the local timing is advanced or retarded in accordance with the bit decision as indicated in the table of FIG. 3. If, for example, the counter 64 does not reach zero (a plus (+) condition) for both half cycles and the bit decision is at a logic "one," the advance/retard logic 60 provides an advance pulse to the half cycle period counter 61. If the phase comparator counter 64 goes beyond zero to the minus (−) side for both half cycles, this unbalance error pulse is coupled to the advance/retard logic 60 and is combined with the bit decision output at the advance/retard logic 60 to provide an advance or retard pulse to the half cycle period counter 61 in accordance with the bit decision as indicated in the table of FIG. 3. Since there is always at least one signal transition per baud interval regardless of the input data, an examination of data transitions ("mark" to "space" or "space" to "mark") is not required as in the previously described frequency-shift keyed case. To retrieve the last sampled output pulse and to recouple this pulse to the bit decision counter 56 and phase comparator counter 64 so as to be used again as the first sample in the next baud interval when an advance condition occurs, sampled output pulses from the AND gate 55 are registered at last sample register 63 which provides an output level to AND gate 66. To transfer the last sampled output pulse registered in the last sample register 63 from AND gate 66, the X32(b) advance control pulse from advanced/retard logic 60 is applied to AND gate 66.

In both the frequency-shift keyed case and the phase-shift keyed case, the effective integration time of the phase control loop may be increased by averaging the unbalanced errors over several baud, or in the phase-shift case, half baud intervals before making a phase correction. These and other additional embodiments and modifications which will be obvious to those skilled in the art are included within the spirit and scope of the invention.

What is claimed is:

1. In a digital demodulator of the type employing means responsive to binary coded data signals at a baud rate to provide during each baud interval a data signal of an energy level indicative of a data bit, means for locally generating timing signals at a first integral multiple including unity of said baud rate, means for locally generating a plurality of sampling pulses at a sampling rate which is a second given integral multiple of said baud rate, and means responsive to said data signal of said energy level and said plurality of sampling pulses to provide a plurality of equally distributed output sampled pulses at said sampling rate during the presence of said data bit, the improvement comprising:

balance-determining means responsive to said output sampled pulses at said sampling rate and said locally generated timing signals applied thereto for comparing the distribution of output sampled pulses within each of certain successive intervals defined by said locally generated timing signals to yield at multiples of said baud rate including unity control signals to adjust said locally generated timing signals to maintain synchronization of said local timing signals with said data signals only when at least a predetermined lack of balance exists in the relative distribution of said output sampled pulses between respective ones of said certain successive intervals.

2. The combination as claimed in claim 1, wherein said balance determining means is a reversible counter responsive to said plurality of output sampled pulses and said fixed integral multiples of said local timing signals applied thereto for comparing the number of output sampled pulses registered during each of certain successive intervals defined by said locally generated timing signals.

3. The combination as claimed in claim 1, including a data bit decision counting means responsive to said output sampled pulses and said timing signals at said first integral multiple of said baud rate for manifesting the presence of a given data bit upon a given number of sampled output pulses being registered during a baud interval.

4. In a digital demodulator for frequency-shift keyed signals occurring at a given baud rate representing different data bits to provide during each baud interval a signal of a D.C. energy level indicative of a data bit having means for locally generating timing pulses at a rate a given integral multiple of said baud rate and means for generating a plurality of sampling pulses at said multiple rate, the combination comprising:

means responsive to said signal of D.C. energy level and said plurality of sampling pulses to provide a plurality of equally distributed output sampled pulses at said multiple rate during the presence of said data bit, a counting means renponsive to said timing pulses at said multiple rate to provide a first control pulse at the end of the first half and also at the end of the second half of said baud interval, a reversible counter responsive to said first control pulses for counting in a first direction during the first half of said baud interval and for counting in a reverse direction during the second half of said baud interval, said reversible counter responsive to said output sample pulses at said multiple rate applied thereto for producing at the end of a baud interval a second control signal only when a predetermined lack of balance exists between the number of output sample pulses occurring during said first and said second halves of said baud interval.

5. The combination as claimed in claim 4, including a bit decision counting means responsive to said output sampled pulses and said local timing signals at said baud rate for manifesting the presence of said data bit upon registering a given number of sampled pulses during a baud interval and to provide a bit decision output signal at said baud rate indicative of said data bit.

6. The combination as claimed in claim 5, including a control means responsive to said second control signals obtained in response to successive baud intervals for integrating these second control signals over several baud intervals and for performing during the presence of said bit decision output signal the function of adding an extra timing pulse when said unbalance is in one sense to said counting means to advance said counting means or of inhibiting a timing pulse when said unbalance is in an opposite sense to said one sense to said first counting means to retard said counting means.

7. The combination as claimed in claim 6, including means responsive to said sampled output pulses for storing the last sampled output pulse of said baud interval and for performing the function of recoupling said last sampled output pulse back into said reversible counter and said bit decision counter only when said control means is performing said adding function.

8. In a digital demodulator for phase-shift keyed signals having means responsive to phase-shift keyed signals at a given baud rate including alternating current waves of like frequencies but of different phases representing different data bits to provide during each baud interval a square wave input signal at said frequency, means for locally generating timing pulses at a rate a given integral multiple of said baud rate, means for locally generating a square wave reference signal at said frequency, and means for comparing said first square wave signal indicative of a data bit with said locally generating square wave reference signal to provide during each baud interval a signal of an energy level indicative of that data bit, the combination comprising:

means for locally generating a plurality of sampling pulses at said multiple rate, means responsive to said signal of said energy level and said plurality of sampling pulses to provide a plurality of equally distributed output sampled pulses at said multiple of said baud rate during the presence of said data bit, a counting means responsive to said timing pulses at said multiple rate to provide a first control signal at the end of each quarter of said local baud interval, a reversible counter responsive to said first control signals for counting in a first direction during the first quarter of said baud interval, for counting in a reverse direction during the second quarter of said baud interval, for counting again in said first direction during said third quarter of said baud interval and for counting again in said reverse direction during the fourth quarter of said baud interval, said reversible counter being responsive to said output sampled pulses at said multiple rate applied thereto for producing at the end of each half baud interval a second control signal only when a predetermined lack of balance exists between the number of output sampled pulses occurring during said first and second quarters and during said third and fourth quarters of said baud intervals, respectively.

9. The combination as claimed in claim 8, including a bit decision counting means responsive to said sampled output pulses and said local timing signals at said baud rate for registering the presence of a given data bit upon registering a given number of sampled output pulses during a baud interval and to provide an output bit decision signal indicative of said data bit.

10. The combination as claimed in claim 9, including means responsive to said second control signals for integrating said second control signals over several half baud intervals for performing depending upon said bit decision signal the function of adding an extra timing pulse when said unbalance is in one sense to said counting means to advance said counting means or of inhibiting a timing pulse when said unbalance is in an opposite sense to said one sense to said first counting means to retard said counting means.

11. The combination as claimed in claim 8, including a control means responsive to said second control signals for performing the function of adding an extra timing pulse to said counting means to advance said counting means or for inhibiting a normal timing pulse to said counting means to retard said counting means.

12. The combination as claimed in claim 11, including means responsive to said sampled output pulses for storing the last sampled output pulse of said half baud interval and for performing the function of recoupling said last sampled output pulse back into said reversible counter and said bit decision counting means only when said control means is performing said adding function.

References Cited

UNITED STATES PATENTS

| | | | |
|---|---|---|---|
| 3,109,143 | 10/1963 | Gluth | 325—320 |
| 3,222,454 | 12/1965 | Losee | 325—320 XR |
| 3,233,181 | 2/1966 | Calfee | 178—88 XR |
| 3,353,101 | 11/1967 | Kawai et al. | 178—67 XR |
| 3,439,283 | 4/1969 | Danielson | 178—66 XR |
| 3,447,085 | 5/1969 | Haas et al. | 178—67 XR |

ROBERT L. GRIFFIN, Primary Examiner

R. S. BELL, Assistant Examiner

U.S. Cl. X.R.

178—67, 69.5; 325—30